United States Patent [19]
Andrews

[11] 3,842,877

[45] Oct. 22, 1974

[54] QUICK FASTENING SCREW DEVICE

[76] Inventor: Alton M. Andrews, 1522 San Pablo Ave., Lafayette, Calif. 94612

[22] Filed: June 5, 1972

[21] Appl. No.: 259,753

[52] U.S. Cl.............. 151/14 R, 85/1 L, 85/32 V, 151/22
[51] Int. Cl............................................ F16b 39/30
[58] Field of Search......... 85/1 L, 12, 32 V, DIG. 2; 151/22, 7, 14 R; 285/391

[56] References Cited
UNITED STATES PATENTS

| | | | |
|---|---|---|---|
| 1,192,352 | 7/1916 | Smith | 151/22 |
| 1,261,014 | 4/1918 | Dongan | 85/1 L |
| 1,440,613 | 1/1923 | Mathias | 85/1 L |
| 1,483,164 | 2/1924 | Driggs | 85/1 L |
| 2,372,566 | 3/1945 | Gazley | 85/32 V |
| 2,437,638 | 3/1948 | Evans | 151/22 |
| 2,810,922 | 10/1957 | Davis | 85/DIG. 2 |
| 3,027,042 | 3/1962 | Graves | 151/22 |
| 3,121,453 | 2/1964 | Modrey | 85/32 CS |
| 3,361,174 | 1/1968 | Bedford | 151/7 |

FOREIGN PATENTS OR APPLICATIONS 1,233,461    5/1971    Great Britain.................... 151/7

Primary Examiner—Edward C. Allen
Attorney, Agent, or Firm—Joseph B. Gardner

[57] ABSTRACT

A quick fastening device including a screw having an elongated shank with threaded sectors alternating with flat or chord surfaces; and also including a corresponding female member having a hole with threaded sectors alternated with unthreaded sectors wherein the threads have been omitted. To quickly attach the screw to the female member, the screw is inserted into the hole to a depth sufficient to bring portions of the threads of the shank and female member in positions for engagement; and then, the screw is given a partial turn to cause the threads to engage and become secured to each other. The external threads of the screw, and the internal threads of the hole terminate in beveled surfaces such that the threads will be self-aligning when the screw is secured by a partial turn. The hole of the female member may be oval or otherwise distorted from a true circle whereby the screw will bind or clamp in the secured position when given the partial turn; and one of the members may be resilient to enable it to frictionally grip the other and to return to its original condition upon removal of the other from engagement therewith.

4 Claims, 6 Drawing Figures

QUICK FASTENING SCREW DEVICE

BACKGROUND OF THE INVENTION

This invention relates to screw type fastening devices, and more particularly this invention provides a screw arrangement wherein the screw may be inserted into a female member to a depth sufficient to bring the threaded parts into position for engagement and then secured by a partial turn of the screw.

Conventional screws or bolts are secured in complementary threaded or tapped holes by engaging complementary threads provided for this purpose, and by then turning the screw until it reaches a final position whereupon the screw tightens and binds itself within the hole. Occasionally, screws are fabricated or formed rather long to permit their use in several possible applications. Thus, certain screws or bolts may prove to be unnecessarily long for specific applications; and then the screws must be rotated for excessive periods to draw the parts together, and to finally tighten and secure the screws properly.

For example, electrical fixtures and other components such as switches and convenience outlets, are commonly supported by an electrical connection box which is a metal or plastic structure recessed into a ceiling or a wall of a building. The electrical connection box ordinarily has tabs or other structures with threaded holes for support of the electrical components. The boxes are mounted on studding or joist members of a building during construction and prior to the panelling, plastering or other finishing for the ceiling and walls. After the ceiling and the walls have been panelled or plastered etc., the electrical fixtures (or other components) are "hung" or mounted by attachment to the previously placed connection boxes. Since the ceiling and wall panelling, or plastering, etc., may vary in thickness and positioning, the degree of recessing of the boxes may vary and the length of screws required for mounting each electrical fixture to its connection box cannot therefore be determined in advance. To solve this problem, the electrical fixtures are provided with screws long enough for unusual mounting situations. This, however, results in screws that are much too long in most instances. These long screws must by tightened by many turns of a screwdriver which is both laborious and time consuming for a workman.

It is an object of this invention to provide an improved screw fastening arrangement wherein a screw may be inserted into a hole and slipped or pressed freely thereinto to a depth necessary to bring the threaded parts into transverse alignment, and then the screw may be secured in position by a single partial turn thereof.

Further objects are to provide a screw having a shank with threaded sectors alternating with flat or chord surfaces from which the threads have been omitted; a complementary female member having a bore with the mating threads out of alignment, but into which the screw can be readily moved inwardly to a depth required for bringing the engageable parts into transverse alignment, whereupon a partial turn of the screw will tightly secure the same to the female member by bringing the mating threads together; and a fastener device in which one or the other of the male and female members are resilient so that the threads thereof are compressed by the other to frictionally secure the same together, the resilient threads returning to their original condition when the members are separated.

DESCRIPTION OF THE DRAWING

The various features and advantages of this invention will become apparent upon a consideration of the following description taken in connection with the accompanying drawing which illustrates certain exemplary embodiments of the screw fastening device in accordance with the teachings of this invention. The views of the drawing are as follows:

As shown in FIG. 1, a screw embodying this invention includes an elongated shank 11 that extends from an enlarged head or like structure 12. The head 12 may have means for applying a rotational force or moment thereto, such as a groove 13 adapted to seat a screwdriver therein. The shank 11 includes two or more sectors 14 having external threads 15 cut or otherwise formed therealong. Flat unthreaded sectors or chord surfaces 16 alternate around the screw shank with the threaded sectors 14. FIGS. 1, 2, 3, and 5 show screws having the shank 11 with two threaded sectors 14 alternating with two flat chord surfaces 16. In the embodiment of FIG. 3, the screw shank 11' includes three threaded sectors 14' equally spaced circumferentially around the shank, and three flat chord surfaces 16' alternating with and interposed between the threaded sectors 14'. All of the numerals used in association with the embodiment of FIG. 3 are primed to differentiate the same from other embodiments.

As shown in FIGS. 2 through 6, the shank 11 of the screw or bolt is adapted for insertion into a hole or bore 18 of a complementary female member 19. The bore 18 includes internally threaded sectors 21 alternating with unthreaded sectors 22. In the case of the bore 18, the unthreaded sectors 22 have been cut or otherwise formed to provide an enlarged diameter sufficient in extent to permit insertion of the threaded sectors 14 of the shank 11 of the screw or male member without engagement of the female threads 21, as is evident in FIG. 2. As shown in FIGS. 2, 3, and 4 the bores 18 necessarily have major and minor diameters respectively defined by the unthreaded sectors 22 and threaded sectors 21, and the threaded sectors 14 of the screw have a major diameter approximating (but slightly less than) that of the major diameter of the bore 18.

Figure 1:
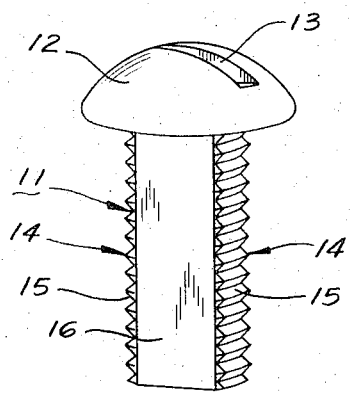
FIG. 1 is a perspective view of a screw fastener in accordance with this invention.
Figure 2:
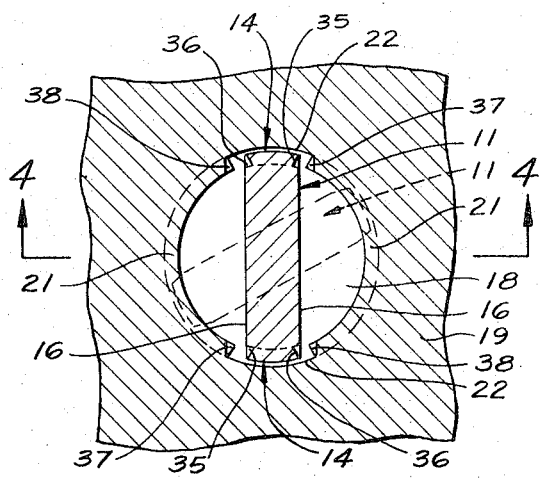
FIG. 2 is a section taken transversely through the screw and a complementary female member into which the screw has been inserted.

The screws and female members of this invention could be formed by conventional means wherein the screw shanks 11 and the bores 18 could first have conventional external and internal threads and the screw then cut or ground on two or more sides to provide the flat surfaces or sectors 16 which are actually chords of the otherwise circular or cylindrical screw shank. In the case of the threaded bores 18 of the female members, a cutting or grinding tool could be inserted into the bore to remove the internal threads along the sectors 22. It would not be necessary that these sectors 22 remain circular or cylindrical, but merely that the bores be enlarged in these sectors 22 to receive the externally threaded sectors 14 of the screw shanks 11. Therefore, the shanks 11 may be inserted and moved inwardly to a depth sufficient to bring the parts snugly together whereupon a partial turn of the screw will secure it within the bore 18 to hold the parts snugly together. Alternatively, the screws and female members of this invention could be formed by molding or casting. This would be more particularly applicable when the parts are formed of plastic or other readily moldable material.

Figure 5:
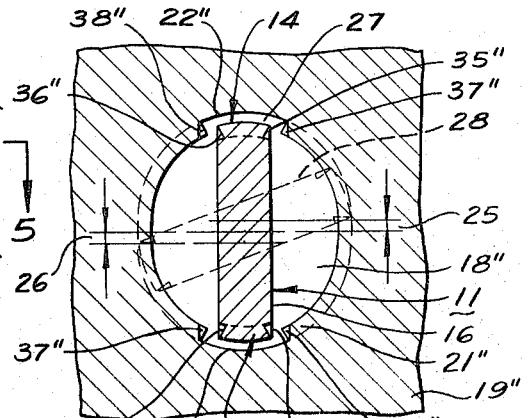
FIG. 5 is a transverse section looking along the plane 5—5 of FIG. 4, but illustrating yet another embodiment of this invention.

FIG. 5 illustrates an embodiment of this invention (the double-primed form of the same numerals being used to identify the various elements) wherein the hole 18" of the female member is not round but is oval. Short dimensions indicated by the numerals 25 and 26 shown between the arrows indicate an offset between two centers of curvature and the true center of the hole 18". This hole is formed of two separate arcuate portions connected in extended spaced relation by relatively flat portions at their ends, but may be of other shapes such as a more or less elliptical form. The threaded sectors 21" as will be noted are placed at the ends of the short diameter, while the unthreaded sectors 22" are placed at the ends of the long diameter. When the shank 11" of a screw is inserted into the hole 18", there will be a clearance 27 at both ends. Then when the screw shank 11" is given a partial turn in a clockwise direction as shown by the dashed lines 28 in the drawing, the threaded sectors 14" of the shank 11" will bind against the outer surface of the shorter diameter of the hole and the parts will be tightly secured together, and the more the shank is turned (unless the screw is turned beyond center), the tighter will be the bind between the shank and the female member.

Other means can be provided for increasing the binding and locking effect of the parts. For example, the threads 15 of the screw shank 11 or of the threads of the hole 18 may have a slightly increased pitch over the other. In this way, the partial turn of the screw shank 11 within the hole 18 in the proper direction will increasingly tighten and will bind the parts together. As will be understood, the change in pitch is gradually increased from the point of entry of the screw to its position of full engagement in the hole or bore. The binding effect may also be provided for by decreasing the depth of the space between adjacent teeth of the threaded portions of either the shank or bore. The decreased depth should be confined to either the inner end of the shank or the outer end of the bore.

Figure 4:
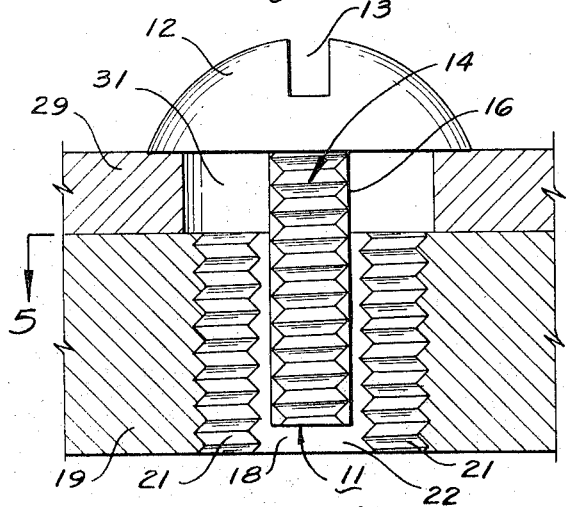
FIG. 4 is a longitudinal section looking along the plane 4—4 of FIG. 2.

In FIG. 4, a work piece or part 29 is shown positioned on the support member 19 having the hole 18 to thus constitute the female member. A somewhat enlarged cylindrical hole 31 in the work piece permits the shank 11 to readily extend through the hole when the shank is turned about its axis sufficiently from the position shown, and then when the shank is extended into the hole the desired amount, it is turned to engage the threads in the hole and the work piece will then be held tightly between the member 19 and the screw head 12.

If the pitch of the threads of the shank or of the female member is made different from one another as previously explained, additional turning of the shank will further tighten the engagement between the parts.

A further feature of the invention is the beveling of preferably both the internal and external threads at the entrance ends thereof so that the threaded sectors 14 and 21 may be readily started into engagement when brought into transverse alignment. As best shown in FIGS. 1 and 4, one end, and desirably both ends of each of the threads of the male member are provided with bevels 35 and 36 on the upper and lower portions of the thread, the upper and lower bevels meeting along a sharp edge and sloping upwardly and downwardly respectively in an inward direction toward the root of the thread. Correspondingly the ends of each of the female threads are formed with bevels 37 and 38 and thus when the screw is turned and its threads placed in initial engagement with the threads of the female member a bevel of the male threads will invariably engage a bevel of the female threads. As the rotation of the screw continues, the screw will be slightly raised or lowered until the threads of the one member become properly engaged with the other. The formation of the screw and female members with the bevels at the end of the screw and female members with the bevels at the end of the threads may be easily accomplished in the molding or casting process of manufacturing the screws and female members.

In the drawings, the shank is shown as a part of a screw having an enlarged head, and the female member is shown as part of a larger assembly that is not completely illustrated. It will be understood that the screw shank can be any elongated part having external threads, and that the female member may also be in other forms. For example, the screw shank can be a stud protruding from a larger machine part, and the female member may be a nut. Preferably, at least the lowest of the threads of the screw are formed of a slightly different increased engagement-causing pitch relative to the others, thereby providing a tightening of the engagement between the threads of the screw and of the female member when the threads are completely engaged.

Figure 6:
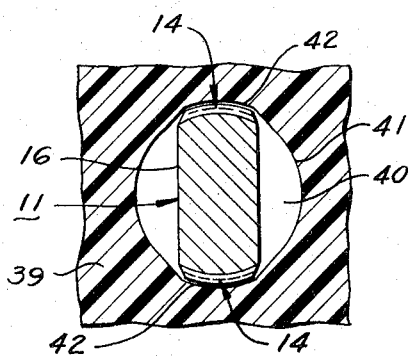
FIG. 6 is a transverse section similar to FIGS. 2, 3 and 5, but showing still another embodiment of the invention.
Figure 3:
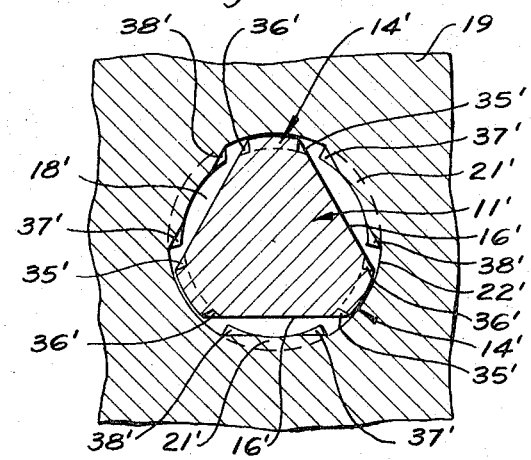
FIG. 3 is a transverse section similar to FIG. 2, but showing another embodiment of this invention.

A further modified embodiment of the invention is illustrated in FIG. 6, and in this form of the invention at least one or the other of the male and female members is resilient. Further, the members are dimensioned so that the threads of the resilient member are deformed or compressed as the screw is rotated to interlock the threads. As a consequence, a resilient frictional engagement is defined between the interconnected threads. In the embodiment of the invention shown in FIG. 6, the screw or male member 11 is taken to be rigid and the receptacle or female member 39 is resilient. Accordingly, the screw 11 may be the same both structurally and functionally as the screws heretofore described and shown partly in FIG. 1.

The female member 39 may be formed of any of a number of resilient materials including natural and synthetic rubbers, and various synthetic plastic materials, as indicated in FIG. 6, such as polysulfide. The bore 40 in the member 39 has angularly spaced threaded sectors 41 that alternate with threadless sectors 42. The screw is inserted into the bore 40 to its full extent by aligning the threaded sectors 14 thereof with the threadless sectors 42, all as previously explained, and upon angular displacement of the screw, the threaded sectors 14 thereof compress the threaded sectors 41 of the member 39 to effect the aforementioned resilient frictional interengagement therebetween. This arrangement has the further advantage that should the screw 11 become lost, a conventional screw can be used since the threaded sectors 41 may be provided with standard dimensions and the threaded sectors 14 of the screw 11 simply dimensioned to have a slightly greater diameter than the inner or minor diameter across the threaded sectors 41.

It will be clear that this invention lends itself to very rapid engagement and disengagement of screws in threaded bores particularly where a relatively large number of threads are to be engaged. No need will be required in such a situation for a workman to turn a screw an excessive number of turns to draw the parts snugly together as in prior art attaching devices.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A combination of a screw member and a female member having a bore for receiving said screw member; said screw member comprising a shank having a duality of threaded sectors and a duality of flat surfaces extending longitudinally of said shank and being chords which cut off cylindrical portions of said shank between said threaded sectors; said bore having a duality of threaded sectors with internal threads complementary to and engageable by the threads of said shank, and a corresponding duality of unthreaded sectors interposed between and alternating with said threaded sectors, said unthreaded sectors extending longitudinally of said bore; said bore of the female member having a long diameter and a short diameter to form an oval in cross section, said unthreaded sectors extending longitudinally along said bore at the long diameter thereof, and said threaded sectors being positioned along the short diameter of said bore, the shank of said screw being insertable into said bore with the threaded sectors of said screw being aligned transversely with the long diameter of said bore and without engagement between the threads of the shank and threads of the bore, the transverse length of the shank being greater than the shorter diameter of the bore to the extent that rotation of the shank in the bore will be limited when the threaded portions of the members are engaged with each other; said threaded sectors of the female member being of greater arcuate width than the threaded sectors of the shank and being spaced from each other circumferentially sufficient to permit the threaded portions of the same member to pass longitudinally therebetween; said threaded portions of both members have threads with their transverse ends beveled along the upper and lower surfaces of each thread, the upper and lower bevels formed thereby meeting at a radially extending relatively sharp edge.

2. The combination of a screw member and a female member in accordance with claim 1 wherein the threads of said screw member are resilient and the diameter of the cylinder defined by the threaded sectors thereof is slightly greater than the short diameter of said bore defined by the threaded sectors thereof such that a resilient binding action will occur when the threads of one member are moved into engagement with the threads of the other member.

3. The combination of a screw member and a female member in accordance with claim 1 wherein the diameter of the cylinder defined by the screw member is greater than the short diameter of said bore defined by the threaded sectors thereof such that rotation of the screw member in the bore will be prevented when the threaded portions of the members are in substantial longitudinal alignment.

4. A combination of a screw member and a female member having a bore for receiving said screw member; said screw member comprising a shank having a plurality of threaded sectors and a plurality of flat surfaces extending longitudinally of said shank and being chords which cut off cylindrical portions of said shank between said threaded sectors; said bore having a plurality of threaded sectors with internal threads complementary to and engageable by the threads of said shank, and a corresponding plurality of unthreaded sectors interposed between and alternating with said threaded sectors, said unthreaded sectors extending longitudinally of said bore and extending radially at least to the major diameter of said internal threads; the threads of at least the screw member being resilient and the diameter of the cylinder defined by the threaded sectors of the screw member being slightly greater than the diameter of the cylinder defined by the threaded sectors of the female member such that a resilient binding action will occur when the threads of one member are moved into engagement with the threads of the other member; the shank of said screw member being operable to be inserted into said bore to a depth wherein said members are in transverse alignment whereupon said screw member may be turned to cause the threaded sectors of the shank to engage the threaded sectors of the bore to secure the members to each other; said threaded sectors of the female member being of a greater arcuate width than the threaded sectors of the shank and being spaced from each other circumferentially sufficient to permit the threaded portions of the same member to pass longitudinally therebetween; said threaded portions of both members have threads with their transverse ends beveled along the upper and lower surfaces of each thread, the upper and lower bevels formed thereby meeting at a sharp edge.

* * * * *